Patented July 7, 1936

2,046,610

UNITED STATES PATENT OFFICE 2,046,610

ACID CALCIUM LACTATE COMPOUNDS

Julian K. Dale, Kew Gardens, N. Y., assignor to Royal Baking Powder Company, New York, N. Y., a corporation of New Jersey No Drawing. Application May 23, 1933,
Serial No. 672,465

19 Claims. (Cl. 260—112)

The invention relates to a process for the preparation of acid lactates of calcium and to the acid lactate compounds thus produced. More particularly, it relates to acid calcium lactate compounds in which the quantity of lactic acid is greater than that in neutral calcium lactate and especially to crystalline compounds having three and four lactic acid groups per atom of calcium. It includes correlated improvements and discoveries whereby crystalline acid calcium lactates may be produced.

Compositions or mixtures heretofore have been prepared containing more lactic acid per atom of calcium than the two lactic acid groups present in neutral calcium lactate. Such compositions have been made by simply evaporating one molecular proportion of neutral calcium lactate and one molecular proportion of lactic acid to dryness. The composition so formed is amorphous, is not a chemical compound, and is only a dehydrated mixture of neutral calcium lactate and lactic acid. Such product does not have a definite melting point, and is readily soluble in ethyl alcohol containing a small amount, for example 5% by weight, of free lactic acid. A composition of this type is described in German Patent 271,643.

There has also been reported (Englehardt and Maddrell, Annalen, vol. 63, p. 118, of 1847) a composition alleged to have the probable formula $Ca(C_3H_5O_3)_2.2HC_3H_5O_3.2H_2O$. This composition was prepared by evaporating a solution of neutral calcium lactate and lactic acid in the proportions called for by the formula; during the evaporation some neutral calcium lactate crystallized out, which was removed by filtering and the filtrate then further evaporated; upon cooling a "crystalline web" separated, which was recrystallized from ethyl alcohol, and washed with ether. The melting point of this mixture was 80° C., and it was said to contain 2 molecules of water of crystallization. A similar composition has reputedly been obtained by decomposing neutral calcium lactate with one-half the quantity of sulfuric acid necessary to combine with all of the calcium, filtering off the calcium sulfate, and evaporating the solution containing calcium lactate and lactic acid to a syrup which crystallizes upon cooling. As much of the mother liquor as possible was removed by pressing, and the cake dried, giving a product contaminated with a large amount of the mother liquor and consisting merely of a mixture of neutral calcium lactate and lactic acid.

It is an object of this invention to provide acid lactates of calcium having a definite crystalline structure and composition, and in which the molecular quantity of lactic acid is greater than that in neutral calcium lactate.

A further object of the invention is to provide acid calcium lactates which contain three and four lactate groups per atom of calcium. These compounds may be represented by the probable formulas $Ca(C_3H_5O_3)_2.HC_3H_5O_3$ and $$Ca(C_3H_5O_3)_2.2HC_3H_5O_3;$$

do not contain water of crystallization; and hereinafter will be referred to, for brevity, as "$CaL_3$" and "$CaL_4$".

Another object of the invention is to provide a process for the manufacture of acid lactates of calcium in which a calcium compound and lactic acid are reacted in proportions to form the acid lactates, and in a solvent or crystallizing medium containing an excess of lactic acid.

An additional object of the invention is to provide a process for the preparation of acid lactates of calcium of the formulas $CaL_3$ and $CaL_4$ which may be carried out readily, effectively, and economically either on a laboratory or a commercial scale.

Other objects of the invention will in part be obvious and will in part appear hereinafter.

The invention accordingly comprises the several steps and the relation of one or more of such steps with respect to each of the others, and the products possessing the features, properties, and the relation of constituents, which are exemplified in the following detailed disclosure, and the scope of the invention will be indicated in the claims.

In the practice of the invention, acid lactates of calcium may be produced by assembling a calcium compound belonging to the group consisting of calcium lactate and calcium carbonate and lactic acid under reactive conditions and in a solvent or crystallizing medium which contains an excess of lactic acid. More particularly, a calcium compound, as neutral calcium lactate, may be combined with lactic acid in proportions to give a compound containing at least three lactate groups for each calcium atom and crystallizing from a medium containing an excess of lactic acid. Thus, for the production of the acid calcium lactate $CaL_3$, one molecule of neutral calcium lactate, or an equivalent quantity of lactic acid and a calcium compound, as calcium carbonate, may be reacted or combined with one molecule of lactic acid and crystallized from an ethyl alcohol solution containing an excess of lactic acid. The acid lactate $CaL_4$ may be prepared by reacting or combining one molecule of neutral calcium lactate with two molecules of lactic acid and crystallizing from a solvent medium which is miscible with water and with lactic acid, as methyl alcohol, containing a considerable excess of lactic acid.

The preparation of the acid lactate CaL₃ may be effected by taking the amorphous composition obtained by evaporating a mixture of neutral calcium lactate and lactic acid in proper molecular proportions and dissolving it in warm ethyl alcohol containing an amount of lactic acid, which is from 5 to 15% by weight of the alcohol. The solution thus obtained upon cooling yields a crystalline product having the composition indicated by the formula CaL₃ which separates out readily and may be washed with ethyl alcohol until it is free from mother liquor.

The production of this compound is brought about with substantial exclusion of water. I have found that in aqueous solution, or with a considerable amount of water, the aforesaid compound is not obtained, but in its stead there separates the neutral lactate of calcium. If methyl alcohol be used as a solvent or crystallizing medium, the CaL₃ is converted into CaL₄. The preparation of CaL₃, therefore, is attended by the use of ethyl alcohol containing an amount of lactic acid which is preferably greater than 4 grams of lactic acid per 100 cc. of ethyl alcohol. Under these conditions the amount of water present should not exceed 4 cc. per 100 cc. of ethyl alcohol. When, however, the amount of lactic acid is greater the quantity of water present may be larger. Thus, when 10 grams of lactic acid are present per 100 cc. of alcohol, the amount of water may be increased to, but should not exceed, 8 cc. per 100 cc. of alcohol. When the above conditions are not observed the acid lactate CaL₃ is contaminated with what may be considered an objectionable amount of neutral calcium lactate.

The preparation of the calcium acid lactate CaL₃, as above indicated, may be carried out by dissolving an amorphous mixture of neutral calcium lactate and lactic acid in substantially equal molecular proportions in warm ethyl alcohol containing free lactic acid and allowing the solution to cool, whereupon the acid lactate crystallizes. This lactate may more particularly be prepared in the following illustrative manners:

(a) Anhydrous neutral calcium lactate may be dissolved by warming in ethyl alcohol containing lactic acid in quantities sufficient to form the acid calcium lactate and give a small excess, and from the solution thus obtained CaL₃ separates as a crystalline mass;

(b) To a solution of neutral calcium lactate may be added one molecular proportion of lactic acid, and the mass evaporated practically to dryness;

(c) To a solution of neutral calcium lactate there may be added one-third of the quantity of sulfuric acid required to combine with the calcium present, the precipitated calcium sulfate removed by filtration, and the filtrate evaporated to dryness;

(d) To a solution of lactic acid there may be added a quantity of calcium carbonate sufficient to neutralize two-thirds of the lactic acid present, and the resulting solution then evaporated practically to dryness.

The compositions obtained in any of these manners may then be dissolved in warm ethyl alcohol containing from 5-15% of free lactic acid, the solution cooled, and the CaL₃ which crystallizes out may be separated in any desired manner, as by filtration or centrifuging.

The procedure may also be carried out as above outlined but instead of providing a solution containing neutral calcium lactate and lactic acid in the exact proportions to form CaL₃, the solution is formed so as to contain a small excess of lactic acid over and above that called for by the formula CaL₃. This excess of lactic acid may be from 5 to 15% by weight of the alcohol used in dissolving the amorphous mixture of calcium lactate and lactic acid. Under these conditions it is not necessary to add a further amount of lactic acid to the ethyl alcohol.

More specifically, and as an illustrative embodiment of a manner in which the acid lactate CaL₃ may be prepared, there may be taken 2000 cc. of a lactic acid solution contaning 395 grams of lactic acid and partially neutralizing with 115 grams of calcium carbonate. The resulting solution is evaporated practically to dryness, or until a solid magma is obtained, which contains not more than about 10% of water. The product so obtained is dissolved in about 1200 cc. of 95% ethyl alcohol. The solution is allowed to cool, whereupon the acid calcium lactate CaL₃ crystallizes out and may be separated from the mother liquor by filtration. The crystalline material finally may be washed with ethyl alcohol to free it from uncombined lactic acid.

The acid lactate corresponding to the formula CaL₄ is produced by combining a suitable calcium compound with an amount of lactic acid sufficient to give the acid lactate CaL₄, in a solvent or crystallizing medium containing a large excess of lactic acid. Thus, neutral calcium lactate may be combined with two molecular quantities of lactic acid and crystallized from a medium containing an excess of lactic acid which may be equal to that entering into the combination to form the acid lactate. The crystallizing medium may be water, to which the desired quantity of lactic acid has been added, or other solvent which is miscible both with water and with lactic acid, as for example methyl alcohol, acetone, or glacial acetic acid when these media contain an excess of lactic acid suitable for the preparation of the acid lactate CaL₄. This acid lactate crystallizes out of the media in granular form which may be readily freed from the mother liquor first by filtration or centrifuging, and then from the adhering mother liquor by washing either on the filter or in the centrifuge.

A satisfactory product is obtained when the solvent or crystallizing medium contains an appreciable excess of lactic acid over and above the molecular proportions required, as given in the probable formula Ca(C₃H₅O₃)₂·2HC₃H₅O₃. Within certain limits the greater the excess of lactic acid the more readily the product crystallizes, and the greater the yield whether the crystallizing medium be water or a solvent miscible with water and lactic acid. The preferred excess quantity of lactic acid is about 50% over the molecular proportions entering into the final product.

The preparation may be carried out as follows: one molecular proportion of neutral calcium lactate and four molecular proportions of lactic acid may be dissolved, or three molecular proportions of neutral calcium lactate may be treated with two molecular proportions of sulfuric acid and the precipitated calcium sulfate removed by filtering, or lactic acid may be partially neutralized with the calculated amount of calcium carbonate. The solutions so obtained are evaporated to a syrup, the crystallizing medium added, and crystallization effected. More particularly with reference to the last method of procedure 472 cc. of an aqueous solution containing 92.2 grams of lactic acid may be partially neutralized with 12.8 grams of calcium carbonate. The resulting solution may be evaporated to a syrup containing about 30% of water, and to such syrup while still hot there may be added 80 cc. of methyl alcohol. Upon cooling, the acid lactate $CaL_4$ crystallizes out in almost quantitative yield. The evaporation of the solution containing $CaL_4$ is usually continued until the water content has been reduced to from 30 to 40%, whereupon the crystalline acid lactate may be separated by filtering or centrifugal action. Less water may be removed if desired, and the $CaL_4$ has been obtained from a thin syrup containing as high as 50% water.

I may proceed, however, by carrying the evaporation to a lower water content, for example, from 10 to 20%, and then add, while still hot, a medium which is miscible with water and with lactic acid, such as methyl alcohol, acetone, or glacial acetic acid. The $CaL_4$ crystallizes out upon cooling, in a granular form which is readily freed from mother liquor and may be further purified by washing. In the foregoing process the $CaL_4$ is produced in an aqueous solution containing a considerable excess of lactic acid, and crystallization of the product from the solution takes place after a partial removal of water by evaporation. In order to facilitate the separation of the crystals from the mother liquor, there may be used a water-lactic acid miscible liquid whereby the reaction mixture containing mother liquor and crystals is thinned and the separation thereof more readily effected.

The acid calcium lactates produced are well defined crystalline bodies of definite chemical composition as evidenced by the ability to crystallize and recrystallize, and by the fact that they have definite or fixed melting points. These lactates are also characterized in that they have an amount of lactic acid which is greater than that contained in neutral calcium lactate, the proportions being three and four lactate groups per atom of calcium. The lactic acid present in the acid calcium lactates appears to be somewhat in the nature of lactic acid of crystallization, and seemingly corresponds accordingly to water of crystallization which is found in many chemical compounds. These acid lactates are distinct and different from the amorphous compounds referred to supra, in that they are crystalline, do not contain any water of crystallization, have definite melting points, and possess different solubility characteristics.

The acid lactate having the formula $CaL_3$ is a crystalline product which differs from an amorphous composition which is merely a mixture of neutral calcium lactate and lactic acid in similar proportions in that it is not readily soluble in an ethyl alcohol-lactic acid mixture containing about 5% lactic acid, whereas the amorphous product is readily soluble therein. This acid lactate, in addition to its crystalline character, is further characterized by being anhydrous and non-hygroscopic, by having a melting point of 187° C., in being only slightly soluble in alcohol containing free lactic acid, and insoluble and unaffected by boiling with ether, acetone, chloroform or ethyl acetate. It dissolves readily in ethyl alcohol containing 10% of water, but from this solution the neutral calcium lactate crystallizes and not the acid lactate. While the compound readily dissolves in methyl alcohol, it then reverts to the acid lactate $CaL_4$, which latter compound crystallizes therefrom upon removal of the solvent.

The acid lactate $CaL_4$ is a definite chemical compound of probable anhydrous, and crystalline character, which may be crystallized and recrystallized in the manner of other chemical compounds for purposes of purification. It appears that this lactate may exist either in an anhydrous or in a hydrate form. This type of compound has been found to have a melting point of 153° C., believed to be a hydrated form, and another form having a melting point of 177° C., considered to be an anhydrous compound. It has an acid content of about 45.1%, and is non-hygroscopic. It is soluble in water and slightly in various organic solvents, as methyl alcohol, acetone, glacial acetic acid, isopropyl alcohol, butyl alcohol, etc. which may contain water. The acid lactates $CaL_3$ and $CaL_4$ are well adapted for many uses, where a constituent having an acid reaction is desired, as in leavening compositions to effect evolution of the gaseous or aerating agent.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the preparation of acid calcium lactates, which comprises combining a calcium compound belonging to the group consisting of calcium lactate and calcium carbonate with lactic acid in proportions to give an acid calcium lactate, and crystallizing the desired acid calcium lactate from an alcohol solution, said alcohol containing less than three carbon atoms and containing an excess of lactic acid.

2. A process for the preparation of acid calcium lactates, which comprises combining neutral calcium lactate with lactic acid in porportions to give an acid calcium lactate, and crystallizing the desired acid calcium lactate from an alcohol solution, said alcohol containing less than three carbon atoms and containing an excess of lactic acid.

3. A process for the preparation of acid calcium lactates which comprises combining a calcium compound belonging to the group consisting of calcium lactate and calcium carbonate with lactic acid in proportions to give a compound containing three lactate groups for each calcium atom, and crystallizing the acid calcium lactate from an ethyl alcohol solution containing an excess of lactic acid.

4. A process for the preparation of acid calcium lactates which comprises combining a calcium compound belonging to the group consisting of calcium lactate and calcium carbonate with lactic acid in proportions to give a compound containing three lactate groups for each calcium atom, and crystallizing the acid calcium lactate from a medium consisting of ethyl alcohol and containing not more than 8% water and an excess of lactic acid.

5. A process for the preparation of acid calcium lactates which comprises combining a calcium compound belonging to the group consisting of calcium lactate and calcium carbonate with lactic acid in proportions to give a compound containing three lactate groups for each calcium atom, and crystallizing the acid calcium lactate from an ethyl alcohol solution containing 5 to 15% of lactic acid.

6. A process for the preparation of acid calcium lactates which comprises combining neutral calcium lactate with lactic acid in proportions to give a compound containing three lactate groups for each calcium atom, and crystallizing the acid calcium lactate from an ethyl alcohol solution containing 5 to 15% of lactic acid.

7. A process for the preparation of acid calcium lactates which comprises combining a calcium compound belonging to the group consisting of calcium lactate and calcium carbonate with lactic acid in proportion to give a compound containing four lactate groups for each calcium atom, and crystallizing the acid calcium lactate from a medium miscible with water and with lactic acid and containing a considerable excess of lactic acid.

8. A process for the preparation of acid calcium lactates which comprises combining a calcium compound belonging to the group consisting of calcium lactate and calcium carbonate with lactic acid in proportions to give a compound containing four lactate groups for each calcium atom, and crystallizing the acid calcium lactate from an aqueous medium containing a member of the group consisting of methyl alcohol, acetone and acetic acid and an excess of lactic acid.

9. A process for the preparation of acid calcium lactates which comprises combining a calcium compound belonging to the group consisting of calcium lactate and calcium carbonate with lactic acid in proportions to give a compound containing four lactate groups for each calcium atom, and crystallizing the acid calcium lactate from a methyl alcohol solution containing a considerable excess of lactic acid.

10. A process for the preparation of acid calcium lactates which comprises combining a calcium compound belonging to the group consisting of calcium lactate and calcium carbonate with lactic acid in proportions to give a compound containing four lactate groups for each calcium atom, and crystallizing the acid calcium lactate from an aqueous methyl alcohol solution containing about 50% excess of lactic acid.

11. A process for the preparation of acid calcium lactates which comprises combining neutral calcium lactate with lactic acid in proportions to give a compound containing four lactate groups for each calcium atom, and crystallizing the acid calcium lactate from an aqueous methyl alcohol solution containing about 50% excess of lactic acid.

12. A process for the preparation of an acid lactate of calcium which comprises combining about 115 parts calcium carbonate with 395 parts of lactic acid in aqueous solution, evaporating the mass to a water content of not more than 10%, dissolving the composition so obtained in about 1200 cc. of 95% warm ethyl alcohol, allowing the solution to cool whereupon an acid calcium lactate having the probable formula $Ca(C_3H_5O_3)_2 \cdot 2HC_3H_5O_3$ crystallizes out, and separating the crystals so formed.

13. A process for the preparation of an acid lactate of calcium which comprises reacting about 12.3 parts of calcium carbonate with about 92.2 parts of lactic acid in aqueous solution, evaporating the mass so obtained to a water content of about 30%, adding about 80 cc. of methyl alcohol, cooling whereupon an acid lactate of calcium having the probable formula $Ca(C_3H_5O_3)_2 \cdot 2HC_3H_5O_3$ crystallizes out, and separating the crystals.

14. An acid lactate of calcium containing three to four lactate groups for each calcium atom, said lactate having a definite chemical composition and a fixed melting point of at least 153° C., and being crystalline.

15. An acid lactate of calcium containing three lactate groups for each calcium atom, said lactate being crystalline, slightly soluble in ethyl alcohol containing lactic acid, insoluble in ether, acetone, chloroform and ethyl acetate, and having a melting point of 187° C.

16. An acid lactate of calcium containing three lactate groups for each calcium atom, said lactate being crystalline, non-hygroscopic, anhydrous, slightly soluble in ethyl alcohol containing lactic acid, insoluble in ether, acetone, chloroform and ethyl acetate, and having a melting point of 187° C.

17. An acid lactate of calcium containing four lactate groups for each calcium atom, being crystalline, soluble in water, methyl alcohol, acetone and glacial acetic acid, and having a fixed melting point of at least 153° C.

18. An acid lactate of calcium containing four lactate groups for each calcium atom, being crystalline, hydrated non-hygroscopic, soluble in water, methyl alcohol, acetone and glacial acetic acid, and having a melting point of 153° C.

19. An acid lactate of calcium containing four lactate groups for each calcium atom, being crystalline, non-hydrated, non-hygroscopic, soluble in water, methyl alcohol, acetone and glacial acetic acid, and having a melting point of 177° C.

JULIAN K. DALE.